United States Patent Office 3,560,437
Patented Feb. 2, 1971

3,560,437
METHOD OF PREPARING POLYDIORGANO-SILOXANE POLYMERS FROM CYCLIC POLY-DIORGANOSILOXANES
John P. Szendrey, Midland, Mich., assignor to Dow Corning Corporation, Midland, Mich.
No Drawing. Filed May 19, 1969, Ser. No. 825,969
Int. Cl. C08f 11/04
U.S. Cl. 260—465
5 Claims

ABSTRACT OF THE DISCLOSURE

Cyclic polydiorganosiloxanes of the formula $(R_2SiO)_a$ where each R is an alkyl radical or 3,3,3-trifluoropropyl radical and a is 3 or 4 is mixed with perfluoroacetic anhydride at room temperature and thereafter exposed to moisture to provide polydiorganosiloxane endblocked with perfluoroacetoxy groups.

---

This invention relates to a method of preparing perfluoroacetoxy endblocked polydiorganosiloxanes.

The present invention relates to a method of preparing a polydiorganosiloxane endblocked with perfluoroacetoxy groups consisting essentially of (A) mixing a cyclic polydiorganosiloxane of the formula $(R_2SiO)_a$ where each R is a monovalent radical selected from the group consisting of an alkyl radical of 1 to 6 inclusive carbon atoms and a 3,3,3-trifluoropropyl radical and $a$ is an integer of from 3 to 4 inclusive and at least one weight percent perfluoroacetic anhydride based on the weight of the cyclic polydiorganosiloxane and thereafter (B) exposing the resulting mixture of (A) to moisture at a temperature of less than 50° C. for a time sufficient to provide the polydiorganosiloxane endblocked with perfluoroacetoxy groups.

The present invention is a method for producing perfluoroacetoxy endblocked polymers. The cyclic polydiorganosiloxanes have a formula $(R_2SiO)_a$ where each R is an alkyl group of 1 to 6 carbon atoms or a 3,3,3-trifluoropropyl radical and $a$ is 3 or 4. Examples of the alkyl groups include methyl, ethyl, propyl, butyl, pentyl and hexyl. Examples illustrative of the cyclic polydiorganosiloxanes include

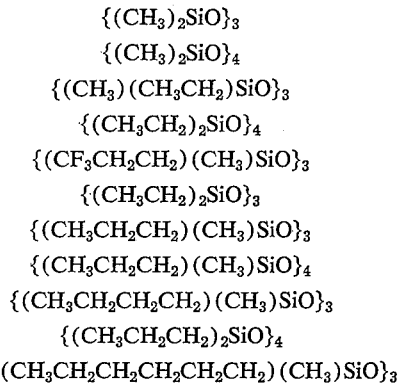

The cyclic polydiorganosiloxane or various mixtures of different cyclic polydiorganosiloxanes are mixed with perfluoroacetic anhydride and the mixture is then exposed to moisture, such as atmospheric moisture, water, steam and the like at a temperature of less than 50° C. until the polydiorganosiloxane endblocked with perfluoroacetoxy groups is formed. Preferably ambient atmospheric conditions are used. However, temperatures up to and including 50° C. can be used. It would be possible to carry out this method at higher temperatures than 50° C., however, any advantages in ease of using the method and reduction in cost would be lost, since a closed system would be required and this would necessarily increase the cost. The perfluoroacetoxy endblocked polydiorganosiloxanes are formed after a few minutes, however, times up to 24 hours and more can be used. Since the reaction proceeds readily at room temperature and no control is necessary the mixtures can be placed in containers and left there until the resulting polymers are desired for use which could be several days or even weeks.

The amount of perfluoroacetic anhydride is preferably from 1 to 20 parts by weight based on the weight of the cyclic polydiorganosiloxane.

The method has the advantage of being inexpensive and easy to use. The resulting perfluoroacetoxy endblocked polydiorganosiloxanes can be used as such by using well-known cross-linkers to make room temperature vulcanizable silicone rubbers, or they can be hydrolyzed to provide hydroxyl endblocked polydiorganosiloxanes, the utility of which is well known. These and many other uses are readily apparent to those skilled in the silicone art.

The following examples are illustrative only and should not be construed as limiting the present invention which is properly delineated in the claims.

EXAMPLE 1

A mixture of 4.44 g. of $\{(CH_3)_2SiO\}_3$ and 5.92 g. of $\{(CH_3)_2SiO\}_4$ was prepared and to this mixture 0.5 g. of perfluoroacetic anhydride was added. The resulting mixture was exposed to 50% relative humidity air at room temperature for 10 days. The resulting polymer was a perfluoroacetoxy endblocked polydimethylsiloxane having a viscosity of 81,100 cs. at 25° C.

EXAMPLE 2

When a mixture of 10 g. of $\{(CH_3)_2SiO\}_3$ and 0.1 g. of perfluoroacetic anhydride is exposed to ambient air at room temperature for 5 days, a perfluoroacetoxy endblocked polydimethylsiloxane is obtained.

EXAMPLE 3

When a mixture of 10 g. of $\{(CH_3)_2SiO\}_4$ and 2 g. of perfluoroacetic anhydride is exposed to ambient air at 50° C. for 30 minutes, a perfluoroacetoxy endblocked polydimethylsiloxane is obtained.

EXAMPLE 4

When a mixture of 10 g. of $\{(CF_3CH_2CH_2)(CH_3)SiO\}_3$ and 1 g. of perfluoroacetic anhydride is exposed to 75% relative humidity air at 29° C. for 24 hours, a perfluoroacetoxy endblocked poly-3,3,3-trifluoropropylmethylsiloxane is obtained.

EXAMPLE 5

When a mixture of 4 g. of $\{(CF_3CH_2CH_2)(CH_3)SiO\}_3$, 5 g. of $\{(CH_3)_2SiO\}_3$, 1 g. of $$\{(CH_3CH_2CH_2CH_2CH_2CH_2)(CH_3)SiO\}_3$$

and 0.75 g. of perfluoroacetic anhydride is exposed to ambient air at room temperature for 7 days, a perfluoroacetoxy endblocked polydiorganosiloxane is obtained wherein the polydiorganosiloxane is composed of the following units: $(CH_3)_2SiO$, $(CF_3CH_2CH_2)(CH_3)SiO$ and $(CH_3CH_2CH_2CH_2CH_2CH_2)(CH_3)SiO$.

That which is claimed is:

1. A method of preparing a polydiorganosiloxane endblocked with perfluoroacetoxy groups consisting essentially of
   (A) mixing a cyclic polydiorganosiloxane of the formula $(R_2SiO)_a$ where each R is a monovalent radical selected from the group consisting of an alkyl radical of 1 to 6 inclusive carbon atoms and a 3,3,3-trifluoropropyl radical and $a$ is an integer of from 3 to 4 inclusive and at least one weight percent perfluoroacetic anhydride based on the weight of the cyclic polydiorganosiloxane and thereafter (B) exposing the resulting mixture of (A) to moisture at a temperature of less than 50° C. for a time sufficient to provide the polydiorganosiloxane endblocked with perfluoroacetoxy groups.

2. The method in accordance with claim 1 wherein each R is a methyl radical and $a$ is 3.

3. The method in accordance with claim 1 wherein each R is a methyl radical and $a$ is 4.

4. The method in accordance with claim 1 wherein the cyclic polydiorganosiloxane is a mixture of $\{(CH_3)_2SiO\}_3$ and $\{(CH_3)_2SiO\}_4$.

5. The method in accordance with claim 1 wherein the resulting mixture of (A) is exposed to ambient air at ambient temperature.

References Cited

UNITED STATES PATENTS

| | | | |
|---|---|---|---|
| 2,910,496 | 10/1959 | Bailey et al. | 260—448.8 |
| 3,346,610 | 10/1967 | Omietanski et al. | 260—448.8 |

HOSEA E. TAYLOR, Primary Examiner

M. I. MARQUIS, Assistant Examiner

U.S. Cl. X.R.

260—448.8